No. 874,279. PATENTED DEC. 17, 1907.
A. P. ANDERSON.
ART OF BAKING.
APPLICATION FILED JULY 19, 1902.
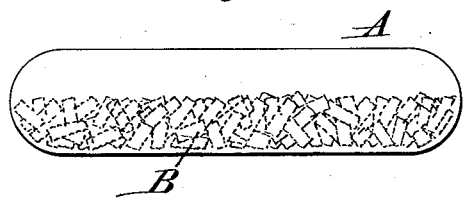
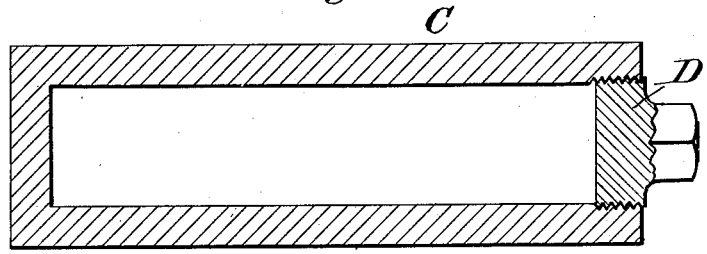
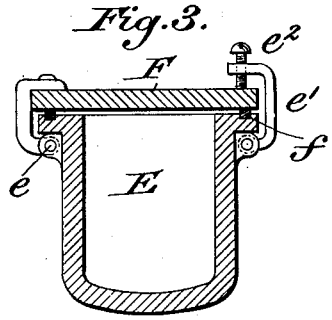
Witnesses
F. H. Schott
M. F. Anderson
Inventor
Alexander P. Anderson
By George Massie
his Attorneys.

UNITED STATES PATENT OFFICE.

ALEXANDER PIERCE ANDERSON, OF NEW YORK, N. Y.

ART OF BAKING.

No. 874,279.      Specification of Letters Patent.      Patented Dec. 17, 1907.

Application filed July 19, 1902. Serial No. 116,279.

*To all whom it may concern:*

Be it known that I, ALEXANDER PIERCE ANDERSON, a citizen of the United States, residing at the city of New York, in the county and State of New York, have invented certain new and useful Improvements in the Art of Baking; and I do hereby declare the following to be a full, clear, and exact description of the invention, such as will enable others skilled in the art to which it appertains to make and use the same.

This invention relates to the art of baking products from dough made of cereal meal or flour, such as bread, biscuits, crackers, cakes, and the like.

The object of this invention is to produce articles of this character in such a manner that the starch contained in the same will be rendered more readily assimilable and digestible than in the articles of bakery as hitherto manufactured, thereby rendering such bakery products more nutritious.

Under the processes as hitherto practiced, the dough prepared from cereal flour or meal prior to baking, is generally raised or rendered spongy or porous by the action of a leaven, yeast, or similar ferment, or other means of introducing or generating gases in its interior, and then baked; or the dough is left in its solid uncellular condition before baking. In the first case, ordinary bread or cake of more or less spongy structure is produced after the raised dough has remained in the oven or other heating chamber for a suitable length of time. In the latter case, a hard product which is not spongy is obtained after baking. Or the unleavened dough is simply dried, as in the case of macaroni, spaghetti and the like. In all of these products it will be found, on microscopic examination, that the starch-granules of the flour or meal of which the article of bakery was prepared, have remained intact and have not been broken up in their structure. This renders the starch contained in these products permeable only with difficulty by the saliva and gastric juices, and not sufficiently exposed to the action of the enzymes on which digestion depends. This objection applies to all portions of the bread or every article of bakery, except the browned crust of the same. This crust, however, does not represent starch, but, rather, carbonized decomposed products of the same, and caramelized products of the ingredients of the cereal flour or meal employed.

In my Patent No. 707,892, dated August 26, 1902, I have described a process of treating starch - material, whereby the starch-granules of the material are broken up and thus rendered permeable to saliva and gastric juices by the action of heat and pressure, and the subsequent sudden removal of such pressure. In my further researches and investigations in connection with this subject, I have found that ordinary unleavened dough made of farinaceous or cereal flour or meal, such as wheat, rye, buckwheat, and other flours or corn, oat and other meals, may be rendered extremely spongy and porous in texture concurrently with baking the same, by first drying it in the air, or, if by artificial heat, in such a manner as to leave all or a portion of the liquid contained in the granules of the starch in the dough, and then treating in a manner similar to that employed in the patent above referred to. Bread or other articles of bakery resulting from this treatment or method of baking, present a porous or spongy mass, generally resembling ordinary toasted bread or zwieback in texture, but differing therefrom in its internal structure by that the starch-granules throughout the body thereof are thoroughly broken up and obliterated so as to produce a fine powder forming a constituent of the cell-walls of the finished product. This product is, therefore, much more readily digestible and assimilable than articles of bakery as hitherto made.

Another important advantage resulting from the use of my new method resides in the fact that I obtain a mass of cereal food which is as porous and spongy as, and, indeed, in most cases, more spongy than, the best products of the baking industry, without the use of any yeast, leavens, or ferments, or the mechanical introduction of carbon dioxid, or other gases, as in the case of what is known as "aerated" bread. I thereby effect not only a great saving in material, time, and expense, but obtain a product which is free from the objectionable substances which are left in the bread when these dough-raising agencies are employed. It is also well-known that when using yeast, leavens or ferments, that a great portion of the starch and other ingredients of the flour or meal used in making the dough, is consumed to support the growth of the fungi or bacteria which form the active principle of the yeast or ferment, and also, to form the carbon dioxid and alcohol which results from such fermentation. A saving of material in this direction is therefore also effected by my process. In fact, a saving of the dough-material is effected also as compared with the processes in which unleavened dough is baked, since, as has been ascertained by investigation in this direction, the pores or cells which occur in the products of bakery from unleavened dough, such as crackers, Passover bread, biscuits, and the like, are probably due to spontaneous or auto-fermentation started by bacteria, or ferments which are accidentally present in the flour, or which have been introduced into the dough from the air, and which bacteria must feed upon the dough-material to grow and to generate the carbon dioxid.

Some of the characteristics distinguishing bakery products made under my invention, under which term I include any product made from dough by baking, such as bread, cake, biscuits, crackers, rolls, and the like, are the following: In baker's bread the walls or lining of the pores or cavities are made up of a mechanical mixture of gluten, cellulose walls (fiber) and carbohydrates, etc. The carbohydrates are composed mainly of starch in the form of granules. These granules are not changed physically to any extent whatever. In some cases a partial swelling of the granule has taken place (a swelling due to the presence of water mixed with the dough) but the granules are all, or substantially all, not obliterated beyond recognition with the microscope. The same is true not only in the crumb or inside of the baker's bread, but of the crust as well. In the crust where the material has been browned or caramelized, the chemical changes have been greater, but even in this case the starch-granules which have been thus changed can after baking be recognized with the microscope. In bread, made according to my process, when a complete "baking" and expansion has taken place there are no intact starch-granules left either in the peripheral or inner portions of the expanded products. In all cases, the starch-granules have been completely broken up or obliterated substantially throughout the mass, the starch being left in a finely powdered condition. The same is true of biscuit, and, especially, in the biscuits or crackers as sold at present where the percentage of starch is much greater than in baker's bread. Biscuits, made according to my invention, have substantially no recognizable starch-granules in them. Hard, dried dough-products like macaroni, spaghetti, etc., can be swelled by my method and made ready to be eaten without further treatment.

Bread made according to my invention is also more minutely cellular or porous than baker's bread. Ordinary commercial biscuits are, of course, not porous or spongy like ordinary baker's bread. Biscuits made according to my invention differ from biscuits or crackers as hitherto made also in their being more spongy or porous. In fact, bakery products made as heretofore do not present a cellular structure in the true sense of the word, but contain cavities rather than cells. In a bakery product made according to my invention the starch-granules are substantially all destroyed, disrupted or broken up beyond recognition, and the minute fragments are fused together with the gluten aleurone matter to form the new product in the shape of cell-walls, which are now a soluble and entirely assimilable form of starch. In the old bakery-products the walls of the cavities are made up of a comparatively coarse heterogeneous mechanical mixture of intact starch-granules, aleurone grains, etc., readily recognizable under the microscope, the starch being substantially unchanged in all but the outer portions of the product. When the products made under my invention are mixed with water or saliva, the membranes or cell-walls break down and are emulsified, and ordinary chemical starch tests now show that substantially all of the original insoluble starch has been converted into soluble starch. This is not the case with any of the bakery products hitherto made, in which only a very small percentage of the starch can be thus modified. It is to this difference that bakery products made under my invention owe their readily digestible and assimilable qualities.

Another advantage of the bakery products prepared according to my invention is that they are absolutely sterile and dry and may be kept for long periods of time, particularly by reason of the surface glaze with which these products are coated as a result of my process. Finally, my method enables me to make bread from any desired mixture of cereal flours, i. e., composite bread.

To carry out the objects and to attain the advantages above outlined, my invention consists essentially in heating air-dried dough made from farinaceous materials or comminuted cereal, for example, flour, meal or the like, or dough dried so as to retain all or a substantial part of the moisture in the starch-granules, above the boiling point of water, preferably between 125° and 175° C., under pressure, and after the same has thus been heated for a sufficient length of time, suddenly reducing or removing the pressure. As soon as the pressure has been suddenly reduced under these circumstances, it will be found that the entire mass is suddenly expanded into a dry and porous or spongy mass, having the characteristics above stated.

My invention also consists in the new article of bakery products, namely, one presenting a cellular mass and having the starch-granules therein broken up or disintegrated into powder-form and forming part of the walls of the honey-combs or cells of the spongy mass.

My invention, moreover, consists in such other features, details and methods as will be hereinafter set forth and pointed out in the claims.

Proceeding now to a detailed description of my invention I desire to state that the same may be carried out in a great variety of ways and includes a great range of starting-materials containing starch. A number of examples of what I consider the preferred manner of carrying out my invention will now be given reference being had to the accompanying drawing which represents three examples of apparatus which may be employed in carrying out my invention.

In this drawing Figure 1 represents a side elevation of a sealed glass tube which may be employed in carrying out my process, Fig. 2, a longitudinal section of a metal cylinder or tube for the same purpose, and Fig. 3, a similar section of another metal vessel for carrying out the said process.

*Example 1: Bread from wheat flour dough.*— I make a tenacious dough from wheat flour by adding water to it. This dough is worked by kneading until it becomes of the consistency and tenacity of baker's dough before the baking. The dough is now worked into sticks or blocks of any desired sizes which are allowed to dry for a day or more until they become substantially air-dried. Wet dough dries slowly at the ordinary temperature. I therefore, preferably place the sticks or blocks on a slowly-heated asbestos plate for six hours, during which time they are kept at a temperature of from 40° to 50° C. At this temperature the starch-granules are not changed in their structure nor broken up. At the end of the six hours' slight heating, the dough sticks or blocks are generally hard and brittle, resembling sticks of macaroni or spaghetti in color and hardness. They are then placed in glass or iron tubes or receivers, such as described in my aforesaid Patent No. 707,892, and is shown at A, Fig. 1, and at C, Fig. 2, of the drawing, and then such tubes are closed or sealed hermetically and then subjected to a baking temperature by heating them in the oven for 20 minutes from 100° to 175° C. The tubes are now taken out and, before cooling, are broken or opened suddenly, as explained in my aforesaid Patent No. 707,892. The dried dough will thereby be immediately expanded or swelled to from two to four times its original volume, but, on account of the not uniformly dry dough, the resulting bread masses are not uniformly porous. In order to attain a more perfect result, the dough sticks or blocks, treated as above, are left in the air until they become uniformly air-dried. I then place these sticks or blocks into the tubes as above, and after having hermetically sealed the tubes and heated them in an oven for 20 minutes from 120° to 165° C., take them out of the oven, and before cooling, suddenly open or break the same. The result is a perfect and uniform mass of bread, which has been slightly over-heated, and, consequently, over-browned. It is manifest that salt and other seasonings, according to taste, may be added to the flour in the above method of preparing the dough.

I find that, the more perfectly the dough has been air-dried, and the longer, and, consequently, more slowly the drying is carried out, the lower is the temperature required. Thus good results will be obtained from dough, air-dried for about two weeks, by submitting it to an oven-temperature of 160° C., for about 20 minutes in sealed vessels as above, and then, while still hot, suddenly opening the vessels. I discovered also that well-dried dough can be uniformly swelled at a lower oven-temperature—say, 150° C.—by prolonging the heating to half an hour or 40 minutes, and then suddenly opening the sealed vessels containing the same before allowing the same to cool.

In Fig. 3 I have shown another form of apparatus which may be employed in carrying out my process and which has also been shown and described in my aforesaid patent. As shown, this apparatus consists of a vessel E having a lid F hinged at $e$ and adapted to be clamped down upon the top of the receiver E by the screw clamp consisting of the hinged arm $e'$ carrying at its upper end the screw $e^2$ which, when the parts are in place, as indicated in Fig. 3, may be turned sufficiently to bear down upon the lid F, all as described in the aforesaid patent, a ring or gasket $f$ of yielding material which will resist the heat to which the vessel is subjected, being preferably interposed between the lid and the top of the receiver to bring about the air-tight joint required.

*Example 2: Bread from rice flour dough.*— I prepare a dough from rice flour and pass it through the same process as above with wheat flour dough. This rice-flour dough when air-dried also expands into a porous mass when the pressure is suddenly released or reduced when the pressure is sufficiently high, but, on account of the small percentage of gluten in rice-flour, it is difficult to make a dry dough from it which will not crumble when dried. The resulting rice-flour bread made from such dried dough according to my process, however, does not crumble.

*Example 3: Spaghetti or Macaroni.*—I take ordinary commercial air-dried spaghetti sticks and then subject them to baking temperature by heating them in sealed tubes, as above, in the oven gradually from 100° C. to 175° C. After the heating I take the tubes out and before any cooling has taken place, break them. The spaghetti will expand to about four times their original diameter and increase correspondingly in length, becoming an enlarged copy of the original. The expanded spaghetti are porous and bread-like, and have the appearance of ordinary bread, especially dry toasted bread, or the form usually sold under the name of "zwieback."

The results may be obtained from air-dried macaroni, vermicelli, noodles, and similar products.

Spaghetti is simply a dried wheat flour dough and has approximately the same percentage of starch and gluten as ordinary wheat flour. In the drying process to which the spaghetti is subjected when made, no heating whatever is applied to it; at any rate not high enough to alter the composition and structure of the starch-granules, gluten and other compounds. The starch therefore expands or explodes when the pressure is released at the end of the above period of heating in sealed vessels, and causes a swelling of the whole spaghetti stick, converting it into bread or a product similar in taste, to the crust of ordinary bread, differing from it mainly in the fact that it is dry and contains no intact starch-granules or starch-granules as such. When sections of this bread-like mass were examined under the microscope all the starch-granules were found to have been broken up.

*Example 4: Conversion of ordinary bakers' bread.*—I may take the crumb or inside of ordinary bakers' bread, and, after thoroughly air-drying the same, subject it to my process thereby obtaining a product similar to the above. Soggy or heavy doughy bread, is particularly suitable for this purpose and may be kneaded up into a doughy form prior to applying my process. The result is a spongy, dry and readily digestible article, such as produced under Examples 1 to 3.

All of the bakery-products made under my process substantially retain the shape of the original dry dough; they have a surface glaze entirely covering them and consisting of dry hydrated starch which is sufficiently impermeable to maintain them in a sterile and dry condition for a considerable length of time.

It will be noted from the above that, while it is preferable to introduce the dough into the heating-chamber or oven in an air-dried condition, there is considerable latitude to be allowed in this respect. The dough may be dried by artificial heat in some instances. but in this case, care must be taken that the heat is not sufficiently strong to bake the same or to entirely deprive the dough of the water or liquid contained in the starch-granules. The moisture or water contained in the dough may also, in some instances, be in excess of the amount of water contained in the starch-granules in an air-dry condition, but such moisture must not be sufficient to break up or macerate the starch-granules during the heating process, in which case, no expansion would follow from a sudden removal or reduction of the pressure. The fact that such latitude in both directions is allowed under my invention, without departing from the gist of the same, I have expressed in the claims by the term "substantially air-dry." It is also to be noted that a certain amount of moisture or vapor in the gas pressing upon the material, above the amount necessary for saturation, will not prevent the result above described from being obtained. However, it is preferable to work with an absolutely dry gas, such as air, that is, one whose amount of water is not above the saturation point. In employing the term "pressure" in the claims I desire to be understood as covering a dry pressure, such for example, as gas or air pressure, or any pressure approximating such dry pressure so nearly as to bring about my result, though perhaps in a less degree.

The temperature of the oven may vary between wide limits, for example, between 120° C. to 200° C., but the vessels containing the material to be treated should be removed when the material within them reaches substantially from 150° to 165° C., which will be generally speaking, also the temperature of the containing-vessels. The pressures corresponding to the above temperatures would vary, the best results being obtained at pressures between 90 to 125 pounds to the square inch. The vessels should then be immediately opened suddenly, since the most perfect expansion depends on a sudden release of the pressure on the material while it is in its hottest condition, and before any cooling has taken place, and, on the other hand, to maintain the material at the highest temperature for any considerable length of time under pressure would result in browning the said material and caramelizing the sugar and starch contained in it to an undesirable extent.

I find that the temperatures given in the examples are the proper baking temperatures, and that, when such temperatures are maintained for the time periods given throughout the mass of the material in process of baking, which condition can readily be secured by properly selecting the sizes, thickness and dimensions of the containing-vessels, very satisfactory results are obtained and the dough is converted into porous bakery products above described.

I have found that when the material is exposed to a heat of 150° to 165° C. for a much longer time than necessary to cause the expansion when the pressure is released, that the above undesirable results take place at even lower temperatures and at lower pressures than above given, and, in connection with the temperature of say—150° to 165° C., would be apt to brown the material to an undesirable extent by caramelizing the sugar and starch.

When large iron cylinders from four to eight inches in diameter are employed for inclosing the dough, the time necessary for heating these cylinders and the contents to the proper point at the oven-temperatures given, may vary from half an hour to an hour.

The above directions as to the extent and time which it is necessary to heat the dough products may be summarized in the statement that the air-dried dough is subjected to a baking temperature until the starch-granule liquid attains the degree of pressure at which steam will be formed when the pressure on the dough is removed.

The pressure must be reduced with such suddenness as to produce the explosive effect described on the starch-granules. The nearer the reduction of pressure can be brought to instantaneous, the better, although there is here also a certain latitude as to degree of suddenness, with which the pressure is reduced or relieved, may be allowed. In construing the term "suddenly reducing the pressure," as employed in the claims, it is therefore, to be understood that any rapidity of reduction of pressure which will result in the explosive effect described, is comprehended under said term. Of course, it is to be understood that the term "suddenly reducing the pressure" is broad enough to include the complete removal of the same, as well as a partial reduction; and is to be so understood wherever employed in the claims. The nearer this reduction approaches a complete removal of the pressure, the better the results will be in general.

Instead of heating the air-dried dough in sealed molds or vessels the same result can be accomplished by compressing heated air, either normal or saturated with steam in sealed chambers or vessels containing the air-dried dough. When the desired time, pressure and temperature have been reached, these chambers or vessels are suddenly opened, the dry dough now swells into bread, which is porous like ordinary bread, differing from it essentially in that it is dry and contains no intact starch-granules.

Resuming briefly, the process when proceeding from the flour to the finished bakery product comprises the following steps:

1st. I take ordinary cereal flour or meal and add water or other liquid, and, if desired, salt and other seasonings. Then work and knead the dough formed by any convenient or suitable method until it becomes uniformly tenacious and of the consistency of bakers' dough.

2nd. Then form the dough into any desired shaped masses, preferably thin sheets, sticks or tubes, and dry these in the air at the ordinary temperature, or dry them at a low temperature not exceeding 75° C. Other methods of drying may be desirable, for example, drying in vacuum pans or in rarefied and dry air, it being observed in all cases that the resultant article is to be substantially air-dry, that is to say, in a condition in which all or a substantial part of the hygroscopic moisture of the starch-granules remains therein.

3rd. When substantially air-dried, as above, the resultant hard and brittle masses are heated under pressure to the baking temperature and after the baking is completed this pressure is suddenly reduced, which reduction may go to the extent of an entire removal of the pressure. This pressure may be produced by placing them into molds or vessels which are sealed and then placed into an oven having a temperature of between 120° to 200° C., and then taking out the molds and without cooling, and while still hot, suddenly opening them.

Obviously and as already stated and shown, it is not necessary, in order to carry out my invention, to prepare and dry the dough, but, it is within the scope of my invention to use already dried dough and submit it to a baking temperature under pressure, and then suddenly remove the pressure.

Of course, it is to be understood that the term "dough" as employed in the specification and claims is sufficiently broad to cover, and it is my intention thereby to cover, not only ordinary dough as prepared prior to making bakery articles, but, also, in its dried shape, such, for example, as macaroni, spaghetti, vermicelli, noodles, and similar thin masses or strips, and also incompletely or insufficiently baked bread, which is in reality composed in part of dough. All of these will result in my new product when treated according to my invention, as I have shown in the above examples.

The new product resulting from my process has the following characteristics: The starch-granules substantially throughout the same have been disrupted or broken up into extremely minute particles. These particles, or remains of the starch-granules, are contained in the cell-walls of the porous or cellular structure of the finished product, together with the gluten and other debris. The new cellular structure thus formed in the products is readily broken down and emulsified by water or saliva, and ordinary chemical starch tests show that the starch is now in the form of "soluble starch." The new bakery products also have a surface glaze of hydrated starchy matter which seals the entire surface against the admission of moisture to the interior. The new products, moreover, retain substantially the shape of the original dried dough mass, but are greatly increased in volume, thus presenting a cellular porous copy of the original product on an enlarged scale, and are distinguished therefrom also by being baked and having their entire surface sealed with a glazing practically impervious to moisture.

Having thus fully described my invention, what I claim as new and desire to secure by Letters Patent is:

1. In the art of baking, the process which consists in heating dried dough and permitting the sudden gasification of the liquid in the starch granules, whereby the starch granules are disrupted.

2. In the art of baking, the process which consists in submitting dry dough in which the starch-granules still retain their liquid to a baking temperature under pressure, and then suddenly reducing the pressure.

3. In the art of baking, the process which consists in baking substantially air-dry dough under pressure, and thereupon suddenly reducing or removing the pressure.

4. In the art of baking, the process which consists in baking thin masses of substantially air-dry dough under pressure, and thereupon suddenly reducing the pressure.

5. The process which consists in treating dough until substantially all of the moisture contained in the same, except the liquid or water contained in the starch-granules is removed, then baking the same at a heat above the boiling point under pressure, and then suddenly reducing the pressure.

6. In the art of baking, the process which consists in drying dough in the form of thin masses until the same forms a dry and unbaked mass, then heating the same above the boiling point of water under pressure, and then suddenly reducing the pressure.

7. In the art of baking, the process which consists in drying dough in the form of thin masses until the same forms a dry, brittle and unbaked mass, then heating the same above the boiling point of water under pressure, and then suddenly reducing the pressure.

8. In the art of baking, the process which consists in submitting substantially air-dry dough under pressure to a temperature between 125° and 175° C., until the same has been baked, and then, before cooling, suddenly reducing the pressure.

9. As a new article of manufacture, a bakery product formed from comminuted cereal in which the starch-granules have been disrupted substantially throughout the mass.

10. A bakery product, consisting of a spongy, baked mass made from comminuted cereal wherein the starch-granules have been disrupted substantially throughout the mass.

11. A bakery product, consisting of a spongy or cellular baked mass made from comminuted cereal wherein the starch-granules have been disrupted substantially throughout the mass, the remains of said granules forming part of the walls of the cells of the products.

12. A bakery product, consisting of a spongy cellular mass of baked comminuted cereal wherein the starch-granules have been disrupted substantially throughout the mass, the remains of said granules forming a part of the walls of the product, the said product being entirely covered with an impermeable surface glazing of hydrated starchy matter.

13. A bakery product, consisting of a sterile spongy or cellular baked mass made from comminuted cereal in which the starch-granules have been disrupted substantially throughout the mass, the remains of said granules forming part of the cell-walls of the product.

14. An artificial food product formed from comminuted cereal and consisting of a porous friable mass of starch material in which substantially all the starch-granules have been disrupted.

15. An artificial food product formed from comminuted cereal and consisting of a porous friable mass of starch material in which substantially all the starch-granules have been disrupted, the remains of said granules forming part of the cell-walls of the product.

16. A bakery product consisting of a cellular baked mass made from comminuted cereal wherein the cell-walls are formed of disrupted starch-granules fused together with gluten aleurone matter, said cell-walls being emulsifiable in water or saliva.

17. An artificial food product formed from comminuted cereal and consisting of a porous mass of starch material in which substantially all the starch granules have been disrupted.

In testimony whereof I affix my signature, in presence of two witnesses.

ALEXANDER PIERCE ANDERSON.

Witnesses:
JOHN K. SMALL,
GUNTHER K. ACKERMAN, Jr.